United States Patent [19]
Hasselbach

[11] 3,788,590
[45] Jan. 29, 1974

[54] MOLDING APPARATUS
[75] Inventor: Arthur Hasselbach, Cranbury, N.J.
[73] Assignee: Beta Crafts, Incorporated, Hightstown, N.J.
[22] Filed: Feb. 22, 1972
[21] Appl. No.: 227,792

[52] U.S. Cl.................. 249/95, 249/164, 425/803
[51] Int. Cl........................................ B22d 19/04
[58] Field of Search... 249/163, 164, 165, 166, 167, 249/168, 120, 139, 142, 143, 144, 140, 92–97; 425/803, 450, 450 C, DIG. 57, 803; 164/385, 391, 392, 393

[56] References Cited
UNITED STATES PATENTS

| | | | |
|---|---|---|---|
| 2,388,569 | 11/1945 | Petersen | 249/142 X |
| 975,481 | 11/1910 | Tidnam | 249/142 X |
| 3,332,658 | 7/1967 | Lemelson | 249/139 |
| 883,569 | 3/1908 | Rodgers | 249/143 X |
| 975,135 | 11/1910 | Kelsey | 249/143 |
| 1,560,205 | 11/1925 | Cassell | 249/163 |
| 1,915,488 | 6/1933 | Gere | 249/164 X |
| 2,939,299 | 6/1960 | Sherbloom | 249/165 X |
| 3,309,738 | 3/1967 | Friedman | 249/164 X |
| 3,393,890 | 7/1968 | Lemelson | 425/DIG. 57 |
| 1,453,861 | 5/1923 | Zenke | 249/163 X |

FOREIGN PATENTS OR APPLICATIONS

| | | | |
|---|---|---|---|
| 989,845 | 5/1951 | France | 249/164 |

*Primary Examiner*—J. Spencer Overholser
*Assistant Examiner*—John S. Brown

[57] ABSTRACT

A mold for wax, soap, plaster, and the like which includes a two part mold with each part having a peripheral flange, a pair of plates each having an opening conforming to the configuration of a mold part and means for aligning the plates in overlying relationship with the flanges of the mold parts disposed therebetween. Clips engage the plates to hold them together and means are provided to hold the mold parts and plates in an upright position.

7 Claims, 4 Drawing Figures

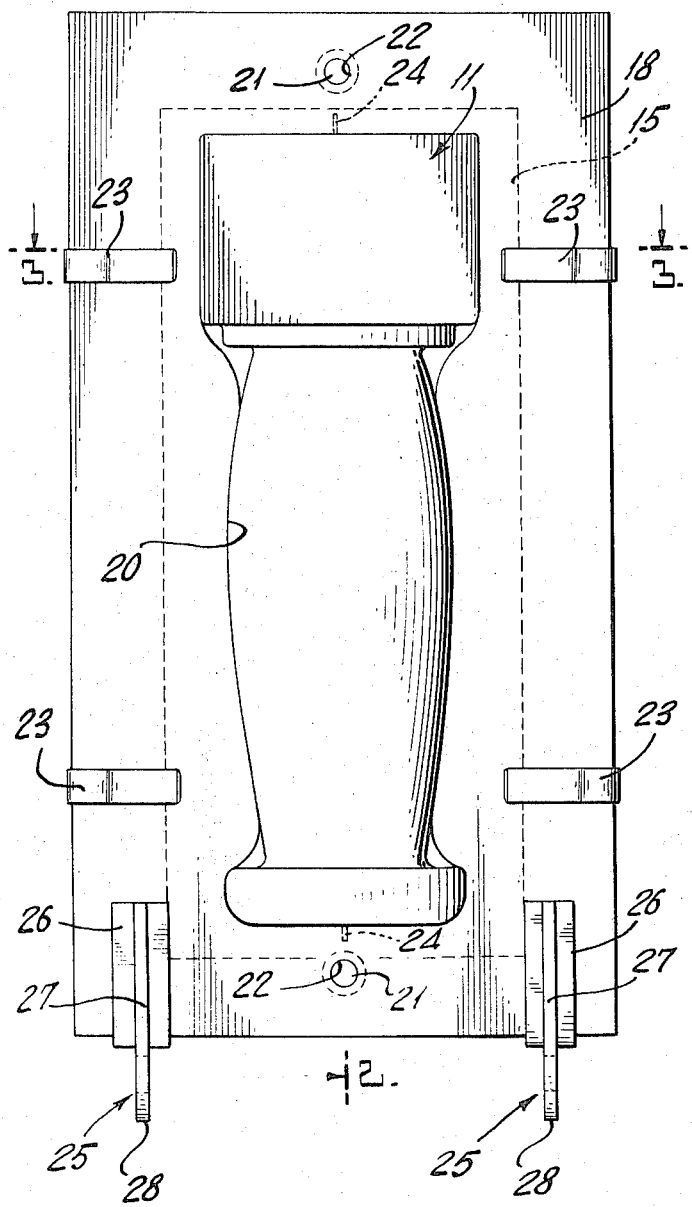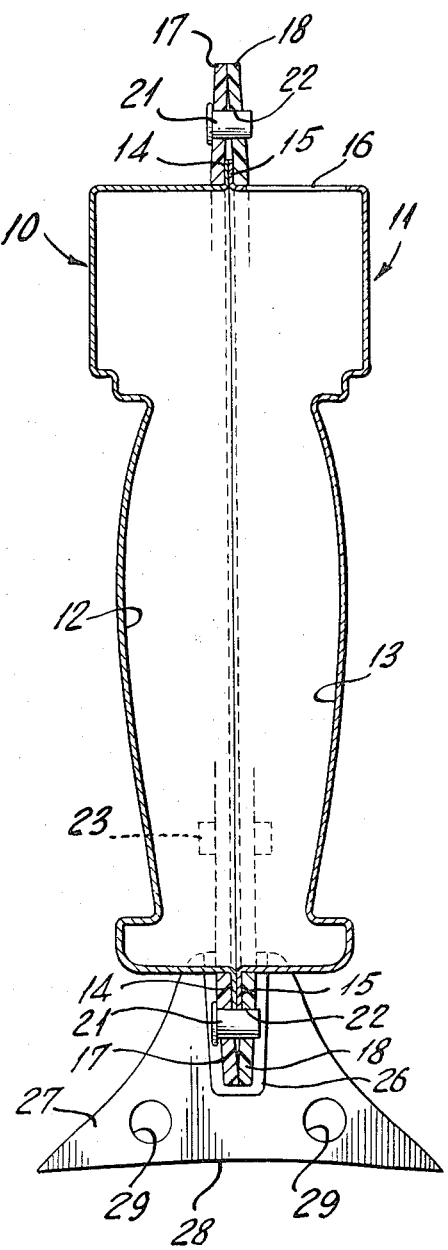

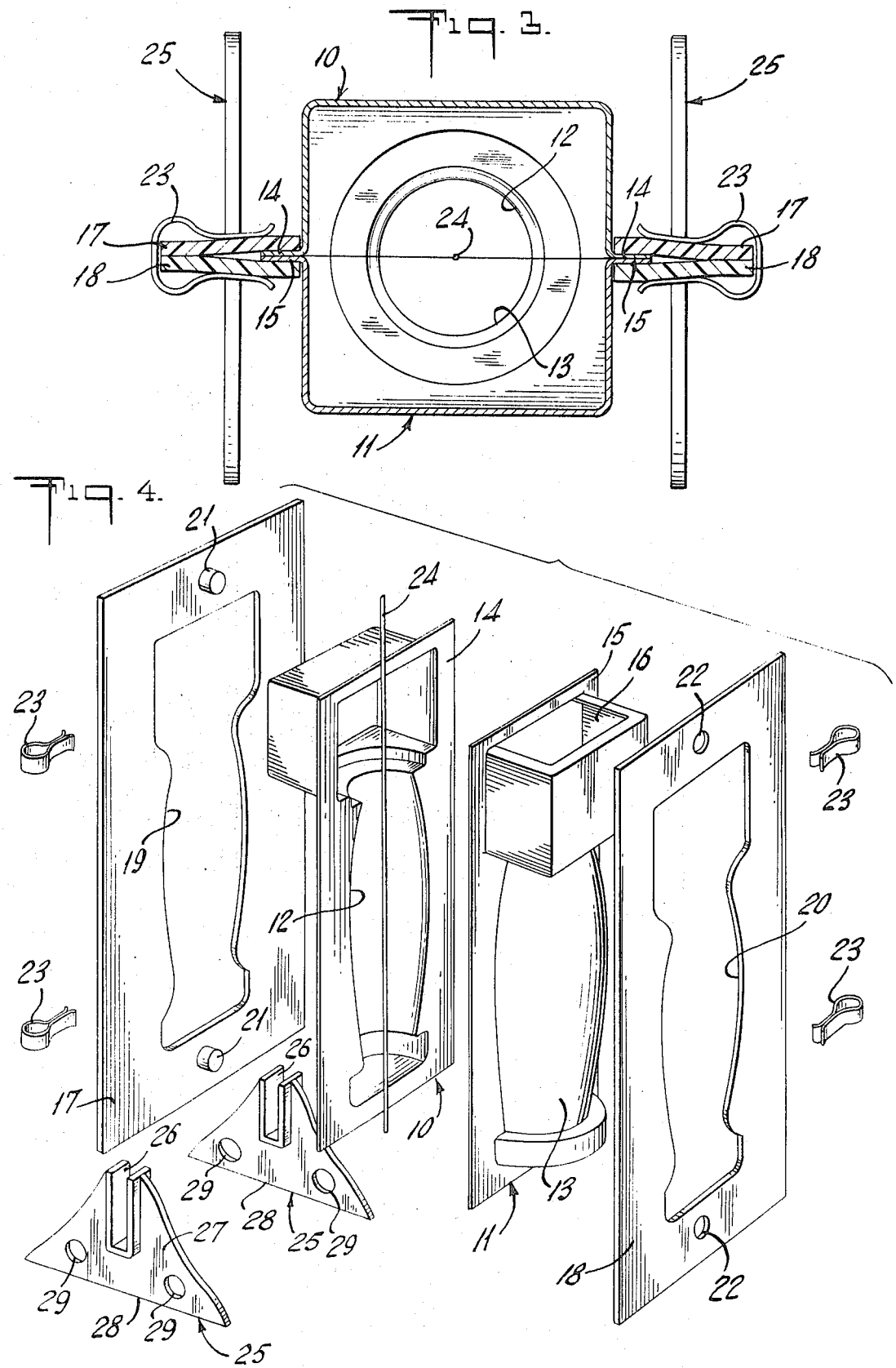

MOLDING APPARATUS

This invention relates to molds and more specifically to a two part mold embodying means for securing the two parts in precisely aligned relationship and in an upright position to receive the molding material.

It will become apparent that while the invention is particularly useful for making candles in that it affords a safe procedure for pouring hot wax, the invention is useful for molding other materials such as soap, plaster and the like.

While many types of molds have been suggested for making candles, it has been found that molds of plastic or other similar formable materials are particularly useful for the fabrication of candles of various configurations and sizes. With the wide interest in candle molding, plastic molds have been made generally available and packaged in kits which include the mold forms, wax and other materials that may be desired or needed. The molds, generally formed in two parts, are provided with peripheral flanges and the user must secure the mold halves together by adhesive tape or the like and they must be held in an upright position during the pouring operation. To expedite coating, the filled mold is then generally immersed in water and care must be exercised to avoid tilting of the mold or permitting water to enter the top side. When the wax has cooled, the mold halves are removed and the ridge of wax resulting from wax entering the gap between the mold halves must be carefully removed. Not only has it been found difficult to hold the mold halves together, but the havles must be secured in accurate alignment in order to produce an attractive resultant candle.

This invention overcomes the foregoing difficulties and provides a novel and improved mold structure which automatically aligns the mold halves, holds the mold edges in tight engagement one with the other, and affords means for supporting the mold halves in a vertical position for pouring and for subsequently cooling the poured wax. These ends are attained by the provision of a pair of mold halves each having a peripheral flange extending therefrom. A pair of plates having cutout portions are adapted to receive the mold halves and the plates further include aligning means so that upon placement in overlying relationship the mold halves will be precisely aligned. The plates also provide means for holding a wick in the desired location within the mold and clips securing the plates one to the other in tight engagement. Leg clips are also provided which tightly engage the plates and function to hold the plates and mold in an upright position.

Another object of the invention resides in the provision of novel and improved molding means for molding wax and other similar materials.

The above and other objects and advantages of the invention will become more evident from the following description and accompanying drawings forming part of this application.

In the Drawings:

FIG. 1 is a side elevational view of molding means in accordance with the invention;

FIG. 2 is a cross-sectional view of FIG. 1 taken along the line 2—2 thereof;

FIG. 3 is a cross-sectional view of FIG. 1 taken along the line 3—3 thereof;

FIG. 4 is an exploded perspective view showing the individual elements of the molding means of FIG. 1.

Referring now to the drawings, the mold halves are denoted generally by the numerals 10 and 11 having recesses 12 and 13 respectively, each of which constitutes one longitudinal half of the completed form. It is to be understood that the recesses may have any desired ornamental configuration. Each mold half includes a surrounding peripheral flange 14, 15 and the top of the mold half 11 has an opening 16 for receiving the molding material.

The mold halves 10 and 11 are held in overlying relationship by a pair of relatively rigid plates 17 and 18 having openings 19 and 20 respectively which are shaped to closely correspond to the configuration of the mold recesses 12 and 13. The plate 17 is further provided with a pair of studs 21 accurately located relative to the opening 19, and the plate 18 has a pair of openings 22 coordinated with studs 21. With this arrangement, when the plates 17 and 18 are placed in overlying relationship with the studs 21 engaging the openings 22, the mold halves 10 and 11 will be precisely aligned one with the other.

The plates 17 and 18 are held in overlying aligned relationship by a plurality of clips 23 engaging the edges of the plates. The wick 24 is also centered within the mold and clamped between the mold halves as illustrated in FIGS. 1 and 6.

The assembled mold as described above is held in a vertical position by a pair of legs 25 each having a U-shaped portion 26 adapted to firmly receive the lower edge of the assembled mold. The portion 26 is formed integrally with a triangular portion 27 sloping downwardly and outwardly from the upper ends of the U-shaped portion to form an elongated base 28. The triangular portion 27 also has a pair of openings 29 so that rods can be inserted through corresponding openings in each leg to facilitate handling of the filled mold and lowering it into a cooling bath and at the same time cause it to remain upright. The U-shaped portion 26 of each leg 25 also serves as a clip to firmly secure the plates in overlying relationship.

The mold as described above provides an effective and simplified structure that greatly facilitates the molding of ornamental candles and other articles. Moreover, with this invention, hot wax or other material can be safely handled and the poured mold can be easily transported to a cooling bath without the danger of spilling the molding material or having cooling liquid enter the top of the mold. Furthermore, since the plates 17 and 18 hold the mold halves in tight engagement, little if any peripheral ridge of molding material will be formed and a precise symmetrical article will be produced.

While only one embodiment of the invention has been illustrated and described, it is apparent that alterations, modifications and changes may be made without departing from the true scope and spirit thereof as defined by the appended claims.

I claim:

1. A mold for making candles and other articles comprising a pair of mold halves each comprising a flat plate-like member having a contoured recess therein and a surrounding integrally formed peripheral flange, a pair of flat plates each having an opening therein of a configuration corresponding to the configuration of the recess of one of said mold halves, aligning means on said plates coordinated with said mold halves whereby said plates when placed in overlying relationship with the mold halves there-between said aligning means will align said plates to hold said mold halves in precise registry, means for holding said plates in said overlying relationship, and a wick extending between said mold halves and retained in position by said flat plates.

2. A mold according to claim 1 wherein said aligning means comprises at least two studs on one of said plates and at least two cooperating openings in the other of said plates.

3. A mold according to claim 1 wherein said holding means includes spring clips engaging the edges of said plates.

4. A mold according to claim 3 including a stand for holding said plates in a substantially vertical position.

5. A mold for making candles and other articles comprising a pair of mold halves each having a recess therein and a surrounding peripheral flange, a pair of plates each having an opening therein of a configuration corresponding to the configuration of the recess of one of said mold halves, aligning means on said plates coordinated with said mold halves whereby said plates when placed in overlying relationship with the mold halves therebetween said aligning means will align said plates to hold said mold halves in precise registry, means for holding said plates in said overlying relationship and a stand for holding said plates in a substantially vertical position, said holding means including spring clips engaging the edges of said plates and said stand including a pair of legs each having a U-shaped portion frictionally engaging an edge of said plates when in overlying relationship and a triangularly shaped member secured to said U-shaped member with the edges extending downwardly and outwardly from said U-shaped member to form an elongated base extending transversely of said plates.

6. A mold according to claim 5 wherein each of said triangularly shaped members includes a pair of openings adjoining the base thereof.

7. A mold for making candles and other articles comprising a pair of mold halves each having a recess therein and a surrounding peripheral flange, a pair of plates each having an opening therein of a configuration corresponding to the configuration of the recess of one of said mold halves, aligning means on said plates coordinated with said mold halves whereby said plates when placed in overlying relationship with the mold halves therebetween said aligning means will align said plates to hold said mold halves in precise registry, means for holding said plates in said overlying relationship, said aligning means comprising at least two studs on one of said plates and at least two cooperating openings in the other of said plates and a stand for holding said plates in a substantially vertical position and, said stand including a pair of legs each having a U-shaped portion frictionally engaging an edge of said plates when in overlying relationship and a triangularly shaped member secured to said U-shaped member with the edges extending downwardly and outwardly from said U-shaped member to form an elongated base extending transversely of said plates.

* * * * *